US 6,832,086 B1

(12) United States Patent
Powers et al.

(10) Patent No.: US 6,832,086 B1
(45) Date of Patent: Dec. 14, 2004

(54) MANAGER-DIRECTED METHOD FOR EVENT PRESSURE REDUCTION

(75) Inventors: Timothy L. Powers, Harvard, IL (US); Robert A. Patzer, Lake Zurich, IL (US)

(73) Assignee: Motorola, Inc., Schaumburg, IL (US)

( * ) Notice: Subject to any disclaimer, the term of this patent is extended or adjusted under 35 U.S.C. 154(b) by 176 days.

(21) Appl. No.: 09/592,758

(22) Filed: Jun. 13, 2000

(51) Int. Cl.$^7$ ................................. H04Q 7/20
(52) U.S. Cl. .................... 455/423; 455/424; 455/67.11; 340/506; 379/9.03; 379/14.01
(58) Field of Search .............................. 455/404, 422.1, 455/423, 424, 425, 67.11, 67.17, 501, 560, 419, 420; 340/517, 507, 511, 519, 825.16, 3.1, 3.43, 3.44; 379/9.03, 37, 242, 265.02, 266.07, 221.03, 279, 112.04, 112.01, 112.06, 137, 133, 139; 709/318

(56) References Cited

U.S. PATENT DOCUMENTS

| | | | |
|---|---|---|---|
| 5,752,164 A | * | 5/1998 | Jones |
| 5,870,676 A | * | 2/1999 | Durvasula |
| 5,917,886 A | * | 6/1999 | Halkio .................. 379/37 |
| 5,923,247 A | * | 7/1999 | Dowden et al. ............ 340/506 |
| 5,946,373 A | * | 8/1999 | Harris ................. 379/14.01 |
| 5,946,612 A | * | 8/1999 | Johansson |
| 6,012,152 A | | 1/2000 | Douik et al. ................ 714/26 |
| 6,125,274 A | * | 9/2000 | Komives et al. ............ 455/423 |
| 6,141,565 A | * | 10/2000 | Feuerstein |
| 6,161,010 A | * | 12/2000 | Oguri ..................... 455/423 |
| 6,233,449 B1 | * | 5/2001 | Glitho |
| 6,237,034 B1 | | 5/2001 | Fulford ................... 340/502 |
| 6,239,699 B1 | | 5/2001 | Ronnen .................... 340/507 |
| 6,252,852 B1 | * | 6/2001 | Rowles et al. .............. 370/242 |
| 6,253,339 B1 | | 6/2001 | Tse et al. .................. 370/216 |
| 6,308,071 B1 | * | 10/2001 | Kalev |
| 6,353,902 B1 | * | 3/2002 | Kulatunge et al. .......... 714/712 |
| 6,445,774 B1 | * | 9/2002 | Kidder et al. .............. 379/9.03 |
| 6,477,585 B1 | * | 11/2002 | Cohen et al. .............. 709/318 |

FOREIGN PATENT DOCUMENTS

EP          0738092 A2   10/1996

OTHER PUBLICATIONS

CCITT, "Data Communication Networks—Information Technology—Open Systems Interconnection—Structure of Management Information: Management Information Model", X.720 (01/92).

ITU–T, "Data Networks and Open System Communications OSI Management—Information Technology—Open Systems Interconnection—Structure of Management Information: Management Information Model" Amendment 1: Generalization of Terms X.720 (11/95).

ITU–T, Technical Corrigendum 1—Data Communications Networks—Information Technology—Open Systems Interconnection—Structure of Management Information: Management Information Model, X.720/Corr. 1 (02/94).

CCITT, "Data Communications Networks—Information Technology—Open Systems Interconnection—Systems Management: Event Report Management Function" X.734.

(List continued on next page.)

Primary Examiner—Erika A. Gary
(74) Attorney, Agent, or Firm—Steven A. May

(57) ABSTRACT

The present invention provides a method and apparatus for utilizing existing systems and components in a cellular network for managing network functionality to reduce event pressure between managers and agents. In accordance with the preferred embodiments of the invention, a filter, an event counter module, and a performance measurement module, all residing on the agent, perform event notification filtering, counting, and thresholding in the agent. In accordance with the preferred embodiments, only an alarm is sent to the manager from the agent if event notifications exceed a threshold that is established by the manager on the agent.

20 Claims, 4 Drawing Sheets

OTHER PUBLICATIONS

ITU–T, "Technical Corrigendum 1—Data Communications Networks—Information Technology—Open Systems Interconnection—Systems Management: Event Report Management Functions", X.734/Corr.1 (02/94).

ITU–T, "Series X: Data Networks and Open System Communication OSI Management—Information Technology—Open Systems Interconnection–Systems management: Event report management function", X.734.Amd.1 Corrigendum 1 (10/96).

ITU–T, "Series X: Data Networks and Open System Communication OSI Management—Management functions and ODMA Functions—Information Technology—Open Systems Interconnection—Systems management: Event report management function", X.734.Corrigendum 2 (03/99).

ITU–T, "Specifications of Signaling System No. 7—Stage 1, Stage 2 and Stage 3 Description for the Q3 Interface—Performance Management", Q.822 (04/94).

* cited by examiner

MANAGER-DIRECTED METHOD FOR EVENT PRESSURE REDUCTION

FIELD OF THE INVENTION

The present invention relates generally to network communication, and more particularly, to a method for reducing event pressure on managers in a wireless communication network.

BACKGROUND OF THE INVENTION

Designing, building, and implementing a wireless communication network such as a cellular network requires significant engineering and technical knowledge. The amount of engineering and technical knowledge required to operate and maintain a wireless communication network is equally significant.

A cellular communication system, for example, is a complex network of systems and elements. Typical elements include 1) a radio link to the subscriber a units (cellular telephones) which is usually provided by at least one and typically several base transceiver stations (BTS), 2) a communication link between the base transceiver stations, 3) a controller, typically one or more base station controllers or centralized base station controllers (BSC/CBSC), to control communication between and to manage the operation and interaction of the base transceiver stations, 4) a call controller or switch, typically a mobile switching center (MSC), for routing calls within the system, and 5) a link to the land line or public switch telephone system (PSTN) which is usually also provided by the MSC.

Within each of these elements are numerous subsystems and components. For example, a base station will at least include radio frequency power amplifiers, frequency synthesizers, signal converters, modems, power supplies, fans, etc. A CBSC, for example, may include a mobility manager, voice coders, transcoders, echo cancellers, and may further provide a link to an operations and maintenance center (OMC). The MSC includes systems for switching calls and for providing call related services such as call waiting, call forwarding, voice mail, and the like. Needless to say there are many systems, subsystems, system elements and components that have to function and interact properly for the cellular communication system to work. Furthermore, the many systems, subsystems, system elements and components of a cellular network are arranged hierarchically, wherein the operation of a few or many components may be controlled and managed by one or several elements at a higher hierarchical position within the network. As a result, certain system elements and components of a cellular network are considered managers, which manage the operations of certain other network elements by communicating with agents residing on the network elements.

When things go wrong in a cellular communication system, there are a number of indications. For example, audible and visual indicators (alarms and flashing lights) may activate indicating one or more elements are not functioning properly. Network performance statistics, observed by the cell network operator, may move outside a normal operating range thus indicating that performance of the network is less than optimal and hence suggesting a problem with the system. A general indication telling the operator something has happened at a network element is known as an event or event notification. While most events are informative in nature, some events notify an operator that something is wrong in the network. This is a special form of an event called an alarm. The large volume of data generated within the communication system and the complexity of the data often exceeds the ability of the operators to comprehend or take action on a particular problem, especially if confronted with thousands of events during a short period of time. This leaves the system operators unable to effectively manage the system.

The typical response to a problem is to observe the alarm or alarms, and to react to whatever it is generating the alarm condition. This is known as fault based reaction. Several specialized schemes such as alarm correlation, the use of filters, or the use of simple event counters in the managers have been established in an attempt to reduce the number of events and alarms that must be reviewed or investigated by system operators. One of the problems with such schemes is that the transmission of too many events and alarms from agents to managers within a cellular network can clog the communication link between manager and agent. Additionally, a large number of events may cause the operator to miss a critical alarm. Furthermore, the processing resources of a manager may be severely curtailed as a result of reviewing and investigating the large number of event notifications and alarms that it receives from one or many agents. To reduce the large stream of event notifications and alarms that are transmitted from an agent to a manager, specialized event counters have been utilized which operate within each agent to reduce the event notification stream prior to its transmission to the manager. These methods, however, tend to require highly specific software developed especially for reducing event notifications, wherein the event reduction method is put directly into the software. As a result, implementation of the software requires a large amount of special configuration set-up on the part of the operator. Furthermore, with these methods, duplication of functionality within management areas is unavoidable. Such duplication results in large agent code images, which can be especially troublesome when dealing with embedded systems wherein memory size is highly constrained.

Current systems typically utilize filters at the agent level to reduce the flow of event notifications to the manager. However, the current systems use event counting and event performance thresholding schemes at the manager level to discriminate between alarming and non-alarming events. Because of the hierarchical nature of cellular networks, expansion of the network results in maintenance and operation of a higher number of agents by each of the managers. Therefore, with the current event notification reduction schemes being performed in the managers, expansion of the network can severely hinder the capabilities of the managers. Thus, there is a need for a more intelligent system and efficient system for managing events at the network element (agent), and reducing events pressure using existing systems and components.

DETAILED DESCRIPTION OF THE PREFERRED EMBODIMENTS

The present invention provides a method and apparatus for reducing event pressure on managers in a cellular network. In accordance with the preferred embodiments of the invention, event pressure reduction is performed in the agent, and the agent emits only an alarm to the manager if necessary. The present invention comprises three coupled components residing on the agent: a filter, an event counter module, and a performance measurement module. The filter receives event notifications from the agent and provides filtered events to the event counter module. The event counter module creates event count information for each filtered event and provides the event count information to a performance measurement module. The event count information includes event specific threshold criteria. Based on the event count information and the threshold criteria, the performance measurement module determines whether the filtered event exceeds the established threshold for that event. If the event threshold is exceeded, the performance measurement module alarms the manager so that a system operator can alleviate the problem which triggered the alarming event.

Figure 1:
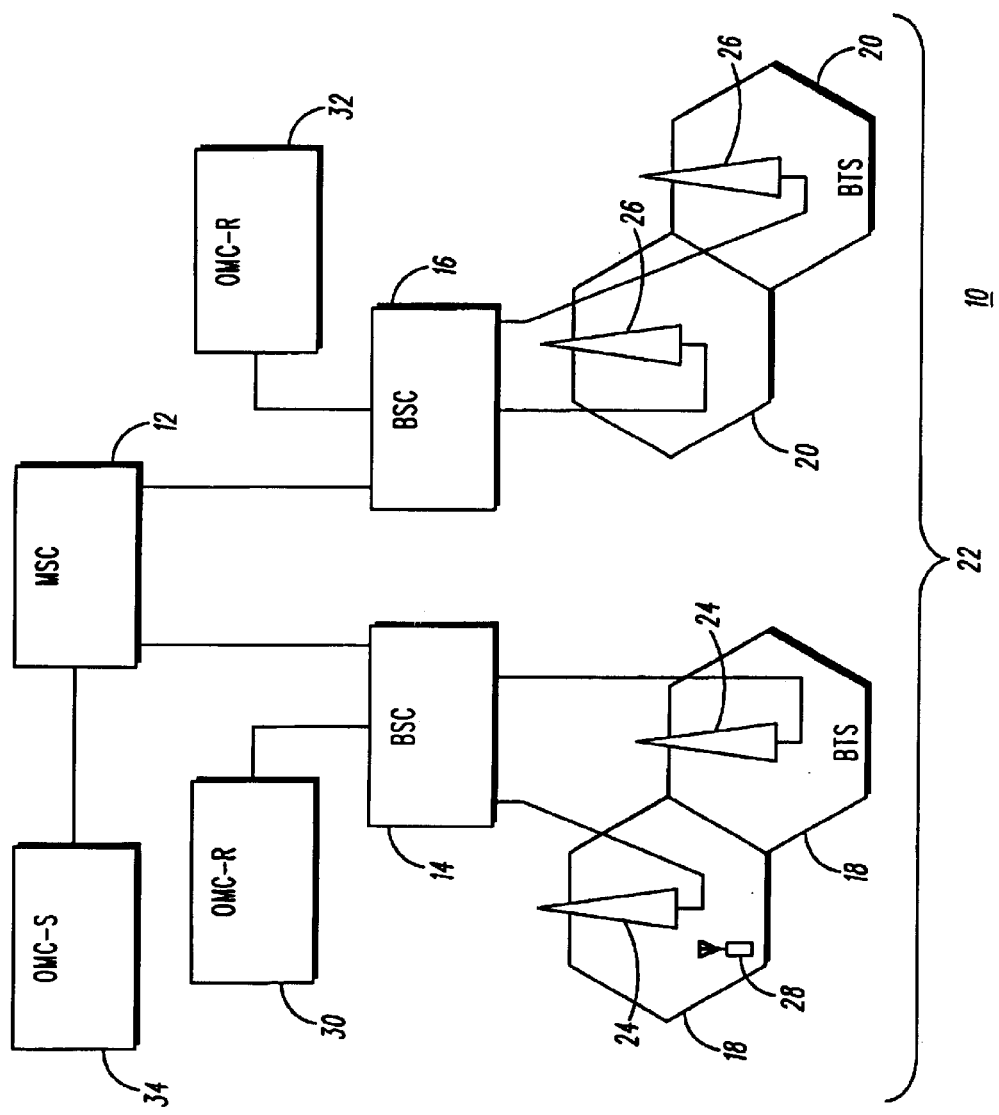
FIG. 1 is a block diagram representation of a wireless communication system.

The present invention will be described in terms of a wireless communication system operating in accordance with one of several communication standards. These standards include analog, digital or dual-mode communication system protocols such as, but not limited to, the Advanced Mobile Phone System (AMPS), the Narrowband Advanced Mobile Phone System (NAMPS), the Global System for Mobile Communications (GSM), the Personal Digital Communications/Personal Communication Systems (PDC/PCS), the IS-55 Time Division Multiple Access digital cellular, the IS-95 Code Division Multiple Access digital cellular and variations and evolutions of these protocols. As shown in FIG. 1, a wireless communication system 10 includes a mobile switching center (MSC) 12, a first base station controller (BSC) 14 and a second BSC 16 servicing a total service area 22. As is known for such systems, each BSC 14 and 16 has associated therewith a plurality of base transceiver stations (BTSs), 24 and 26, respectively servicing communication cells, microcells, picocells and the like, generally shown as cells 18 and cells 20, respectively. It will be appreciated that additional or fewer cells may be implemented as required and without departing from the fair scope of the present invention. MSC 12, BSCs 14 and 16, and BTSs 24 and 26, are specified and operate in accordance with the applicable standard or standards for providing wireless communication services to mobile stations (generally shown as 28) operating in cells 18 and 20. Also shown in FIG. 1 and coupled respectively to BSC 14 and BSC 16 are an Operations and Maintenance Center-Radio (OMC-R) 30 and an OMC-R 32. A single OMC-R 30 may service multiple BSCs, and the actual number of OMC-Rs 30, 32 in system 10 will depend on its size. For example, a small system may require only a single OMC-R 30 to which all of the BSCs are coupled, while a large system may include several OMC-Rs 30, 32. As shown in FIG. 1, the operations of each MSC is managed by an Operations and Maintenance Center-Switch (OMC-S) 34.

A set of network elements will typically have an Operations and Maintenance Center (OMC). All network elements related to the air interface will have an OMC-R 30, while all network elements related to the switching environment will have an OMC-S 34. To consolidate the management of a large system, the OMC-R 30 and OMC-S 34 will report to a higher level manager, the Network Maintenance Center (NMC) (not shown in FIG. 1). The relationship of OMC-R 30 and OMC-S 34 to NMC is that of agents to manager. The OMC-R 30, OMC-S 34, and NMC are generally recognized as managers, while the BSC 14, MSC 12, and BTS 24 are recognized as network elements. Within a network element there is an agent, which is in communication interface with the manager. Generally, a network element will emit an event notification in a proprietary format. The agent in the network element will take the notification and put it into a standard format for communication with the manager.

Figure 2:
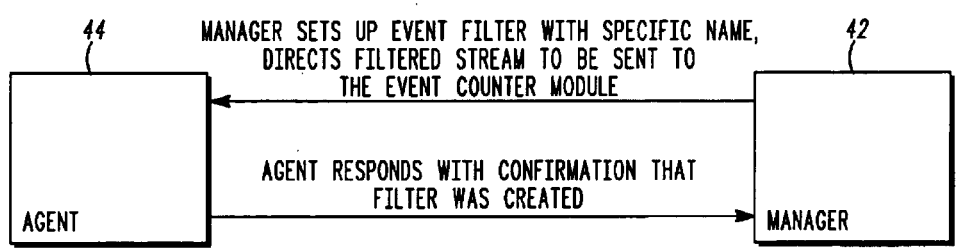
FIG. 2 is a block diagram showing a manager creating a filter on an agent in accordance with the present invention.
Figure 3:
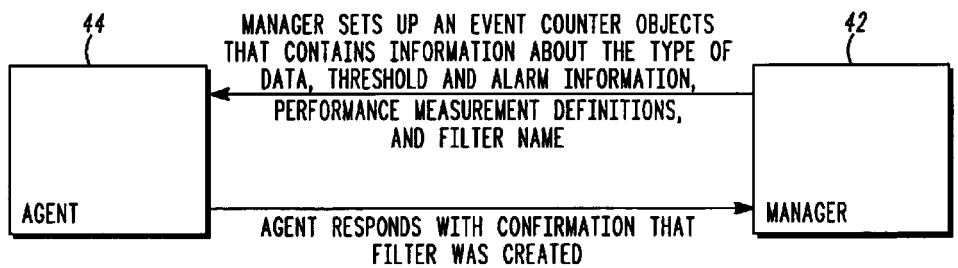
FIG. 3 is a block diagram showing a manager creating an event counter object on an agent in accordance with the present invention.

As will be appreciated, the present invention utilizes existing systems and components for managing network functionality to reduce event pressure between managers and agents. Specifically, the present invention uses a filter, an event counter module, and a performance measurement module to reduce event pressure on the manager. As shown in FIG. 2, the manager 42 initially establishes a filter on the agent 44. The manager 42 establishes the filter with a name that identifies the event for which the filter is being established. Further, the manager directs the filter name to be sent to an event counter module. The agent 44 responds to the manager 42 with a confirmation that the filter was created.

The manager 42 then requests the creation of an event counter object on the agent 44. Each event counter object defines thresholding criteria, event count information, and information on when to send an alarm to the manager if a threshold is exceeded. The agent 44 responds with a confirmation that the event counter was created. Each event counter object is filter specific. The event counters that are defined by the event counter objects are processed by an event counter module that resides on the agent. Finally, the manager sends the appropriate performance measurement information to the agent, and the agent sets up the performance measurement criteria in the performance measurement module. The performance measurement module evaluates the event count information for each filtered event and emits an alarm to the manager if the threshold for the filtered event is exceeded.

Figure 4:
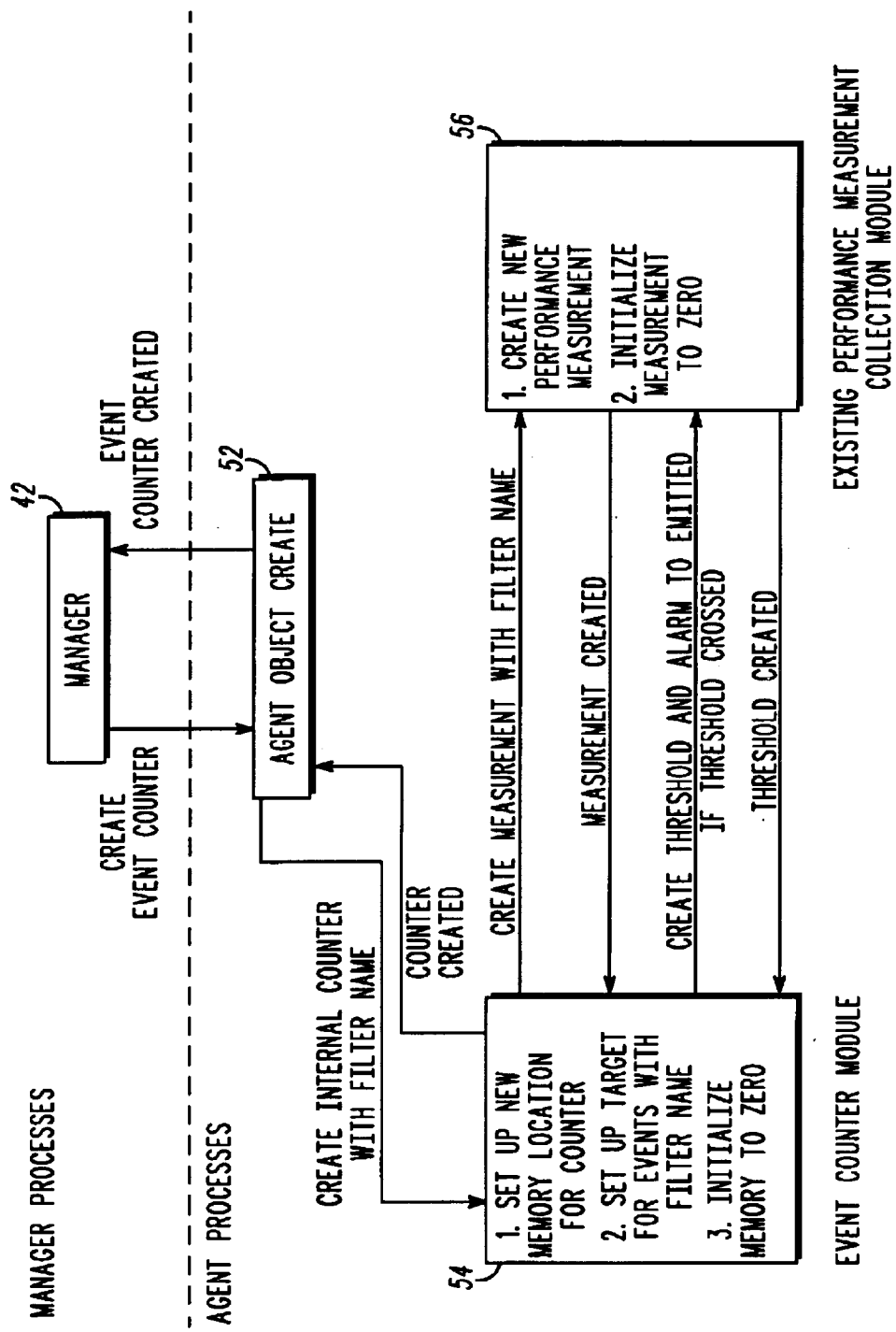
FIG. 4 is a block diagram showing a manager creating an event counter and performance measurement criteria on an agent in accordance with the present invention.

The processes by which the manager requests the creation of event counters and threshold criteria for event notifications is shown in more detail in FIG. 4. The manager 42 requests the creation of an event object 52 on the agent 44. The agent 44 confirms with the manager 42 the creation of the event counter object 52. The event counter object 52 contains the filter name, directions on creating an event counter, performance measurement definitions, and thresholding criteria for each filtered event. The event counter object 52 creates an event counter for each event in the event counter module 54 by establishing a memory location for the event counter, specifying target events for the filter along with the filter name for the event, and initializing the event counter to zero. The event counter module 54 sends a confirmation to the manager 42 that an event counter for the filtered event was created. The event counter module 54 then establishes performance measurement criteria on the performance measurement module 56 for each filter name. The event counter module 54 further establishes threshold and alarm criteria on the performance measurement module 56 for each filter name. The performance measurement module 56 confirms with the event counter module 54 the creation of an object containing the filter name, new performance measurement criteria, thresholding criteria, and alarm criteria.

Figure 5:
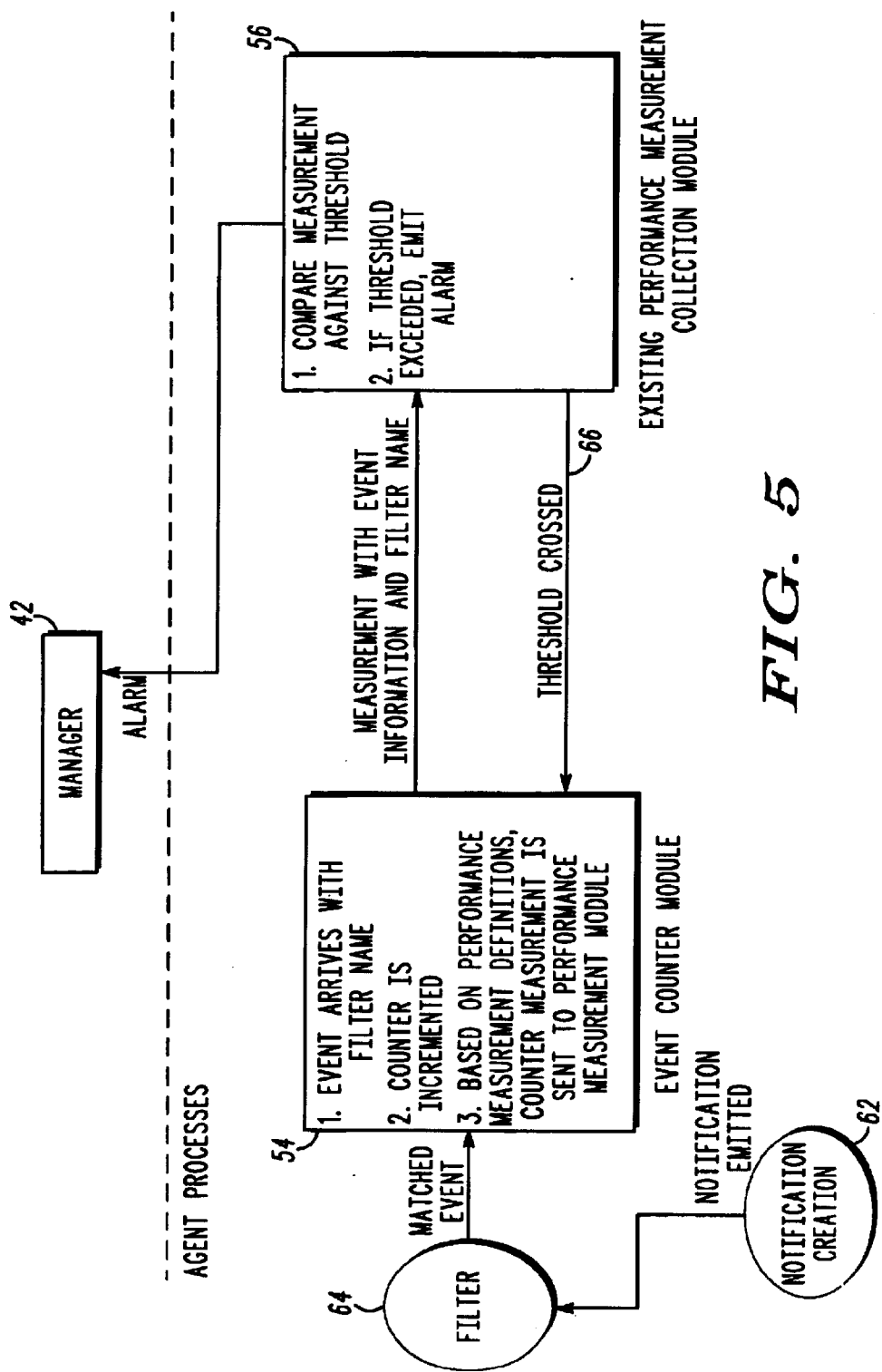
FIG. 5 is a block diagram showing the operation of the present invention in detail.

FIG. 5 shows the operation of the present invention in detail. An event notification 0.62 is created in the network element and sent to the agent 44. The event is matched against the filter 64, and if there is a match, the filter name and the event are sent to the event counter module 54. The event counter module 54 increments the counter for the filtered event. Based on the performance measurement definitions (e.g. time limits) established by the event counter object 52, the event counter module 54 determines whether to send the event count measurement to the performance measurement module 56. If the event count measurement matches those of the performance measurement definitions, the filter name and event count measurement for the filtered event are then transmitted to the performance measurement module 56. The performance measurement module 56 compares event count measurement for the filtered event with the threshold criteria established by the event counter module 54 to determine whether the filtered event exceeds the threshold. If the event count exceeds the threshold, an alarm is emitted to the manager 42. Further, as shown by arrow 66 in FIG. 5, the event counter module 54 receives a notification from the performance measurement module 56 to reset the counter for the filtered event to zero. If the threshold is not exceeded, nothing is transmitted to the manager 42 and the event count for the filtered event retains its value until the next occurrence of the same filtered event.

Consider the following example that illustrates the operation of the present invention in a cellular network. Referring to FIGS. 1–4, it may be desirable to report dropped calls in cell 18 to BSC 14 (i.e. the agent) if the rate of dropped calls exceeds 5 per hour. In current cellular networks (without the present invention), the BSC 14 reports dropped calls to the OMC-R 30 (i.e. the manager). Counting and thresholding of dropped call events is performed in the OMC-R 30. If the OMC-R 30 receives 5 dropped call notifications within an hour from the BSC 14, it will alarm the operator to take corrective action. As the number of BSCs in a cellular network increase, the OMC-Rs will receive more dropped call event notifications and must process the counting and thresholding of the dropped called events. As a result, not only the communication link between each of the OMC-Rs and the BSCs will be clogged, but also, processing capabilities of the OMC-Rs will be severely limited.

As will be appreciated, in a cellular network that uses the method of the present invention, all filtering, counting, and thresholding of dropped call events is performed in the BSC 14, and only an alarm is emitted to the OMC-R 30 if the threshold for dropped call events is exceeded. Initially, the operator provides input to the OMC-R 30 such that the OMC-R 30 sets up a filter for dropped call events in the BSC 14 with directions to send the filter name to the event counter module 54. The OMC-R 30 requests an event counter object 52 creation in the BSC 14 for dropped call events with the counter initially set to zero. The event counter object 52 contains information on counting and thresholding of dropped call events. The event counter module 54 establishes new performance measurement definitions for dropped call events. The threshold criteria for the present example is that the number of dropped calls in one hour may not equal or exceed five. The event counter module 54 not only counts the number of dropped calls with the event counter, but also contains performance measurement definitions, such as the criterion that the time span between the first dropped call and the fifth dropped call cannot be more than one hour. Therefore, the event counter module will use the time limit to see whether the number of events counted fall within the one hour limit.

Referring to FIGS. 1 and 5, a dropped call in cell 18 creates a notification of a dropped call event in the BSC 14. The dropped call event is filtered and the filter name for the dropped call event is sent to the event counter module 54. The event counter for dropped calls is incremented and the event count for the dropped call is sent to the performance measurement module 56. Along with the event count, the time when the call was dropped is also sent to the performance measurement module 56. If the event count for the dropped call is 5 and if the first and the last of the five dropped call events occurred within a one hour time span, the performance measurement module 56 transmits an alarm to the OMC-R 30. At the OMC-R 30, an operator or end user receives the information and takes corrective measures to alleviate the dropped call problem. The performance measurement module 56 also transmits information to the event counter module 54 to reset the event counter for dropped calls back to zero. In contrast, if the dropped calls number less than 5, or if the event count for the dropped calls is equal to or exceeds 5, with the time between the last and the first dropped call exceeding one hour, then an alarm is not emitted to the OMC-R 30. Furthermore, the event count information will remain unchanged.

The table below consists of other events in a cellular network that generate notifications when the thresholds specific to those events are exceeded. The events and their corresponding notifications, as shown in the table, are only a list of possible events in a cellular network and do not preclude the application of the present invention to other possible events not listed. One skilled in the art can apply the present invention to any event arising from various processes within a cellular network that require an agent to notify a manager about the event.

| EVENT | NOTIFICATION |
| --- | --- |
| Network initialization timeout - in minutes. | An event notification is generated whenever the threshold is exceeded. |
| Total BTS power capacity threshold - Watts. | A notification is generated whenever the threshold is exceeded |
| BTS Wattage lost threshold. | An event notification is generated whenever the threshold is exceeded. |
| BTS Wattage gained threshold. | A notification is generated whenever the threshold is exceeded |
| Percentage (%) of network load decrease. | An event notification is generated whenever the threshold is exceeded |
| Percentage (%) of network load increase. | A notification is generated whenever the threshold is exceeded |
| CDMA maximum number of channels supported by the carrier function - including the pilot, sync, paging and traffic channels. | A notification is generated whenever the threshold is exceeded |
| Inter-BSC Hard Handoff Failures: The number of times hard handoff failures occurred. This measurement is done in the target BSC. | A threshold value can be provided for this measurement so a notification is generated whenever the threshold is exceeded. |
| Inter-BSC Hard Handoff Failures: The number of times hard handoff failures occurred. This measurement is done in the target BSC. | A threshold value can also be provided for this measurement, so a notification is generated whenever the threshold is exceeded. |
| Inter-BSC Soft Hand off Failures: The number of times soft handoff failures occurred. This measurement is done in the target BSC. | A threshold value can also be provided for this measurement, so a notification is generated whenever the threshold is exceeded. |

-continued

| EVENT | NOTIFICATION |
|---|---|
| Excessive BTS Originating Call failures: The number of call originations that resulted in failures. This includes any abnormal failures. | A threshold value can also be provided for this measurement, so a notification is generated whenever the threshold is exceeded. |
| Excessive BTS Terminating Call Failures: The number of call terminations that resulted in failures. This includes any abnormal failures. | A threshold value can also be provided for this measurement, so a notification is generated whenever the threshold is exceeded. |
| Number of Call failures in a BTS: This measurement provides the number of call failures within one BTS. This includes all failures and abnormal terminations after the Channel assignment is done by the BTS. This is the summation of origination call failures and termination call failures. | A threshold value can also be provided for this measurement, so a notification is generated whenever the threshold is exceeded. |
| Softer Handoff Failures: The number of times softer handoff failures occurred. This measurement is done in the target BSC. | A threshold value can also be provided for this measurement, so a notification is generated whenever the threshold is exceeded. |
| Mean Traffic Channel (TCH) Busy Time Threshold: The mean number of Traffic Channels allocated and in use per sector expressed as a percentage of time in one hour measurement periods. This is computed by the summation of all the average channel usage measurements in a single carrier in one-hour periods divided by the number of carriers. | A notification is generated whenever the threshold is exceeded. |
| Paging Message Transmission Failures: The number of pages that could not be completed by the BTS on the Access channel. | A threshold value can also be provided for this measurement, so a notification is generated whenever the threshold is exceeded. |
| TCH Seizure Failures: The number of times Traffic channels were not successfully seized by Mobile stations. This is measured by timeouts, when the Base Station Acknowledgment Order. | A threshold value can also be provided for this measurement, so a notification is generated whenever the threshold is exceeded. |
| Maximum Number of Subscribers in HLR: This will be the maximum number of subscribers supported by the HLR. | A notification will be generated whenever the threshold is exceeded. |
| BHCA capability: The maximum BHCA (Busy Hour Call Attempts), the MSC is capable of achieving. | A notification will be generated whenever the threshold is exceeded. |
| Maximum Number of Subscribers in VLR: This will be the maximum number of subscribers supported by the VLR. | A notification will be generated whenever the threshold is exceeded. |
| Maximum Number of Messages: This will be the maximum number of messages that can be stored by the MC. | A notification will be generated whenever the threshold is exceeded. |
| Number of Failed Authentication's: This will be the number of authentications that were not authenticated by the AC resulting in a failure. | A threshold value can also be provided for this measurement, so a notification is generated whenever the threshold is exceeded. |
| Number of Unique Subscribers in Failed Authentications: This will be the number of unique subscriber related authentication failures. | A threshold value can be provided. Note that both the number of subscribers and the number of subscriber related authentication failures must be reported using the same time period. |
| SS (Supplemental Service) Related Operations Failures: The measurement provides the number of failed attempts to obtain Supplemental Service operations by measuring the sum of FEATREQ (Feature Request) and ORREQ (Origination Request) messages received by the HLR. | The measurement generates a notification whenever the threshold is exceeded. |
| Excessive Number of Current MS's Roaming: The current number of Home Subscribers roaming outside the Home System. This is measured by the REGNOT (Registration Notification) messages from other (foreign) VLR's, outside the service coverage area. Unique mobile identifiers make this determination. | A threshold value can also be provided for this measurement, so a notification is generated whenever the threshold is exceeded. |
| Failed Anchor MSC Handoffs: This measurement provides the number of failed handoffs when an MSC serves as an anchor MSC. | The measurement generates a notification whenever the threshold is exceeded. |
| Mean Time To Call Setup Service Failure: this measurement provides the arithmetic mean of the time (in milliseconds) to provide the call setup service to a requesting wireless station. | The measurement generates a notification whenever the threshold is exceeded. |
| Failed Incoming Calls: This measurement provides the number of failed call attempts for incoming traffic and this measurement is initiated when the paging message is sent by the MSC. | A threshold value can also be provided for this measurement, so a notification is generated whenever the threshold is exceeded. |
| Failed Local Calls: This measurement provides the number of failed call attempts for local-to-local traffic; within the same MSC. | The measurement generates a notification whenever the threshold is exceeded. |
| Failed Wireless Emergency Calls: This measurement provides the number of emergency call failures. (Emergency calls include the number 911). | The measurement generates a notification whenever the threshold is exceeded. |
| Failed Wireless To Wireless Calls: This measurement provides the number of failed calls from wireless subscriber to wireless subscriber). | The measurement generates a notification whenever the threshold is exceeded. |
| Failed Wireless To PSTN Calls: This measurement provides the number failed calls from wireless subscriber to PSTN subscriber). | The measurement generates a notification whenever the threshold is exceeded. |
| Failed PSTN To Wireless Calls: This measurement provides the number failed calls from PSTN subscriber to wireless subscriber. | The measurement generates a notification whenever the threshold is exceeded. |
| Unsuccessful Operation For Wireless Originating Point To Point Short Message Service: This measurement provides the number of unsuccessful operations for wireless originating point to point short messages. This is measured by the short message delivery point-to-point (SMDPP) message received by the MSC from its own MC. | The measurement generates a notification whenever the threshold is exceeded. |
| Excessive Mobile Originating Failures: This measurement provides the number of failed short message forwarding from serving VLR to MC. This is measured by the short message delivery point to point (SMDPP) response message sent by the MC. | The measurement generates a notifications whenever the threshold is exceeded. |
| Unsuccessful Special Service Calls: This measurement provides the number of call failures for supplementary services like Call Forwarding etc., measured by the summation of FACDIR with call processing instructions, INFOFWD (call waiting in-band notification), REDREQ or LOCREQ or RUIDIR (remote user interactive directive) message received by the MSC. | A threshold value can also be provided for this measurement, so a notification is generated whenever the threshold is exceeded. |
| Unsuccessful Target MSC Handoffs: The number of handoffs that were unsuccessfully completed when the | A threshold value can also be provided for this measurement, so a notifi- |

-continued

| EVENT | NOTIFICATION |
|---|---|
| MSC is the target switch. This is measured by the FACDIR message response sent by the target MSC. | cation is generated whenever the threshold is exceeded. |
| Unsuccessful Temporary Location Directory Number (TLDN) Allocate Process: This measurement provides the number of times that the TLDN request was unsuccessfully allocated by the serving system. This is measured by the routreq response sent by the MSC. | |
| Unsuccessful (failed) Outgoing International Calls: This measurement gives the number of failed outgoing international calls. | A threshold value can also be provided for this measurement, so a notification is generated whenever the threshold is exceeded. |
| Unsuccessful Incoming International Calls: This measurement gives the number of incoming international calls that failed on a particular MSC. | A threshold value can also be provided for this measurement, so a notification is generated whenever the threshold is exceeded. |
| Registration Failures: This measurement provides the number of unsuccessful registrations. This is measured by the regnot message success indicator received by the VLR MSC. | A threshold value can also be provided for this measurement, so a notification is generated whenever the threshold is exceeded. |
| Shared Authentication Procedures Failures: This measurement provides the number of authentication procedures that resulted in failures in the VLR, when the SSD (Shared Secret Data) is shared. | A threshold value can also be provided for this measurement, so a notification is generated whenever the threshold is exceeded. |
| Excessive Number of Foreign Roamers: This measurement provides the current number of roaming subscribers by measuring the number of registrations from mobile stations outside the home system. | A threshold value can also be provided for this measurement, so a notification is generated whenever the threshold is exceeded. |

Many changes and modifications could be made to the invention without departing from the fair scope and spirit thereof. The scope of some changes is discussed above. The scope of others will become apparent from the appended claims.

We claim:

1. A system for reducing congestion in an Operations and Maintenance Center comprising:
   an Operations and Maintenance Center (OMC);
   a network element separate form, and in communication with, the OMC, the network element comprising:
      a filter receiving event notifications from processes within the network element and providing a plurality of filtered event notifications, wherein each event notification of the plurality of event notifications notifies of a different event;
      an event counter module coupled to the filter for receiving the plurality of filtered event notifications from the filter and counting a quantity of filtered event notifications to produce event counter information; and
      a performance measurement module couples to the event counter module for receiving the event counter information from the event counter module and sending alarms to the OMC.

2. The system of claim 1, wherein the filter is operable to select the filtered event notifications to be sent to the event counter module.

3. The system of claim 2, wherein selection criteria upon which the filter selects the filtered event notifications are established by the Operations and Maintenance Center (OMC).

4. The system of claim 1, wherein the Operations and Maintenance Center (OMC) requests creation of event count objects upon which the event counter module creates event count information from the filtered event notifications.

5. The system of claim 1, wherein the event counter module establishes threshold crossing criteria and alarm emission criteria for the performance measurement module.

6. The system of claim 1, wherein the performance measurement module emits an alarm to the Operations and Maintenance Center (OMC) if the event counter information exceeds a threshold.

7. A method for reducing the number of event notifications sent to an Operations and Maintenance Center (OMC) by a network element separate from the OMC, the method comprising the steps of:
   filtering, by the network element, event notifications to provide a plurality of filtered event notifications, wherein each event notification of the plurality of event notifications notifies of a different event;
   counting, by the network element, the plurality of filtered event notifications to generate event count information from the filtered event notifications; and
   conveying, by the network element to the OMC, an alarm if the event count information exceeds a threshold.

8. The method of claim 7, wherein filtering event notifications comprises the steps of:
   receiving the event notifications; and
   selecting the event notifications based on selection a criteria to provide filtered event notifications.

9. The method of claim 7, wherein counting the event notifications comprises the steps of:
   receiving filtered event notification;
   incrementing an event count based on performance measurement definitions for each of the filtered event notifications; and
   establishing event count information specific to each of the filtered event notifications based on event count criteria.

10. The method of claim 7, wherein emitting an alarm when the event count exceeds a threshold comprises the steps of:
   comparing the event count information against a threshold;
   emitting an alarm to the Operations and Maintenance Center (OMC) if he event count information exceeds the threshold; and
   resetting the event count information if an alarm is emitted to the Operations and Maintenance Center (OMC).

11. The method of claim 7, wherein the Operations and Maintenance Center (OMC) establishes criteria for selection of event notifications.

12. The method of claim 7, wherein the Operations and Maintenance Center (OMC) requests creation of event counter objects having information of thresholding and alarm notification.

13. The method of claim 7, wherein a group of event notifications may be selected and counted as one event.

14. A network element separate from, and in communication with an Operations and Maintenance Center (OMC) the network element comprising:
   means for filtering to provide a plurality of filtered event notifications, wherein each event notification of the plurality of event notifications notifies of a different event;

means for counting to generate event count information from the plurality of filtered event notifications; and means for conveying alarms to the OMC based on the event count information.

15. The apparatus of claim 14, wherein the filtering means comprise:

means for receiving the event notifications; and means for selecting the event notifications based on filtering criteria to provide filtered event notifications.

16. The apparatus of claim 14, wherein the counting means comprises:

means for receiving filtered event notifications from the filtering means;

means for incrementing an event count based on performance measurement definitions for each of the filtered event notifications; and means for establishing event count information specific to each of the filtered event notifications based on event count criteria.

17. The method of claim 14, wherein the means for emitting alarms to the Operations and Maintenance Center (OMC) comprise:

means for comparing the event count information against a threshold;

means for emitting an alarm to the Operations and Maintenance Center (OMC) if the event count information exceeds the threshold; and means for resetting the event count information if an alarm is emitted to the Operations and Maintenance Center (OMC).

18. The apparatus of claim 14, wherein the Operations and Maintenance Center (OMC) establishes filtering criteria for the filtering means.

19. The apparatus of clam 14, wherein the Operations and Maintenance Center (OMC) requests creation of event count criteria for the counting means.

20. The apparatus of claim 14, wherein a group of event notifications may be selected by the filtering means and considered as one event by the counting means.

* * * * *